United States Patent Office 2,773,814
Patented Dec. 11, 1956

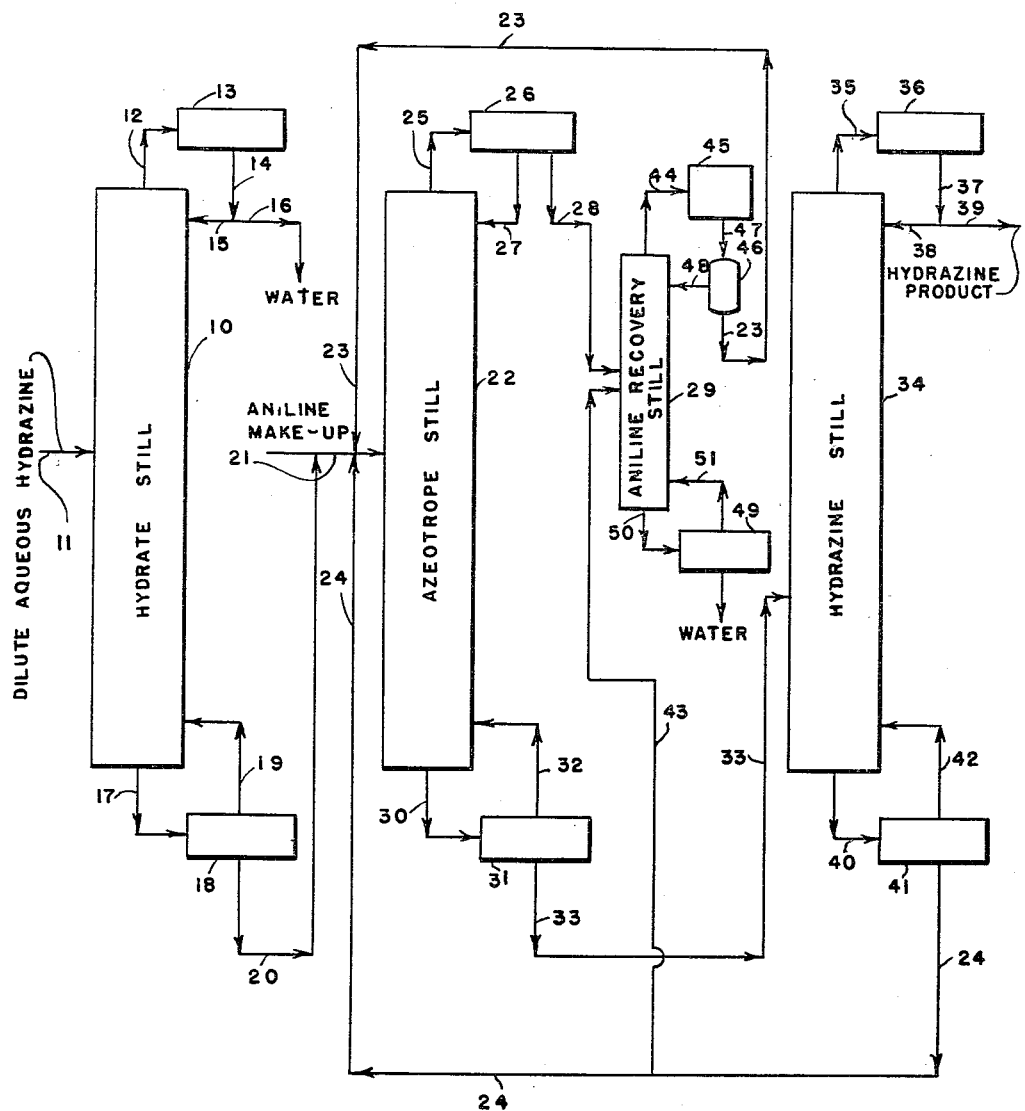

2,773,814

DEHYDRATION OF HYDRAZINE BY AZEOTROPIC DISTILLATION WITH ANILINE

Bernard H. Nicolaisen, Kenmore, N. Y., assignor to Olin Mathieson Chemical Corporation, a corporation of Virginia Application June 12, 1953, Serial No. 361,185

2 Claims. (Cl. 202—42)

My invention relates to an improvement in the process of manufacturing anhydrous hydrazine from dilute aqueous hydrazine solutions using an entraining agent for water in an azeotropic distillation system. More particularly, it relates to an improved azeotropic distillation process for the production of anhydrous hydrazine which is characterized by the control of the composition of the feed material and the reflux ratio in the operation of the azeotrope still in such a process to obtain optimum operation of that still and thereby substantial economic advantage.

In the Raschig process, commonly used for the synthesis of hydrazine, a dilute aqueous solution of hydrazine is obtained by distillation of the synthesis liquor. By atmospheric distillation of this dilute aqueous hydrazine solution, it is possible to obtain a maximum concentration of about 71.5% hydrazine in water. Since this is an azeotrope, further concentration by atmospheric distillation is not possible. Actually, the bottoms obtained by atmospheric distillation of dilute aqueous hydrazine solutions usually comprise aqueous hydazine containing about 50 to about 70% of hydrazine, i. e., approximating the compositions of hydrazine monohydrate ($N_2H_4.H_2O$—64% $N_2H_4$)

and the hydrazine-water azeotrope (71.5% $N_2H_4$). Azeotropic distillation of aqueous hydrazine solutions approximating in composition hydrazine monohydrate or the hydrazine-water azeotrope using an entraining agent for water provides a means to obtain a substantailly anhydrous hydrazine product containing 95% or more of hydrazine. In such azeotropic distillation, the aqueous solution of hydrazine is dehydrated by the removal of water as a component of an entraining agent-water azeotrope which boils at a temperature below the boiling point of the hydrazine-water azeotrope. While this azeotropic distillation can be used to dehydrate less concentrated aqueous hydrazine solutions, it is more advantageous to produce the concentrated aqueous hydrazine containing about 50 to 70% of hydrazine by conventional atmospheric distillation and to utilize the azeotropic distillation to effect further dehydration.

In the usual azeotropic distillation of aqueous hydrazine utilizing aniline as the entraining agent for water, an aqueous solution of hydrazine approximating in composition hydrazine monohydrate or the hydrazine-water azeotrope or a somewhat more dilute solution is charged to an azeotrope still with recycle and make-up aniline. Heat is introduced into the azeotrope still as by means of a reboiler and an aniline-water azeotrope is taken overhead from the azeotrope still and a substantially anhydrous hydrazine-aniline mixture is produced in the azeotrope still. The aniline-water azeotrope taken overhead from the still is condensed and the major portion of the aniline content and a portion of the water content of this azeotrope is returned to the azeotrope still as reflux. If the azeotrope still is not properly operated, a considerable amount of hydrazine will pass overhead from the still with the aniline-water azeotrope. The anhydrous hydrazine-aniline mixture produced in the azeotrope still is passed to a hydrazine still as charge material. The hydrazine still is operated to obtain substantially anhydrous hydrazine as an overhead product with aniline accumulating in the hydrazine still as bottoms. The hydrazine product taken overhead from the hydrazine still usually contains minor amounts of aniline and water, for whatever water is charged to the hydrazine still with the hydrazine-aniline feed mixture from the azeotrope still passes overhead with the hydrazine. The aniline bottoms of the hydrazine still constitute the recycle aniline returned to the azeotrope still for the dehydration of fresh aqueous hydrazine feed.

In the operation of the azeotrope still of the azeotropic distillation process for the production of anhydrous hydrazine, it has been recommended that the feed material to the still have an aniline-hydrazine mole ratio of the order of about 0.5:1 although somewhat higher ratios have been suggested. An azeotrope still operating with a feed material having an aniline-hydrazine mole ratio in this range requires a great number of theoretical plates to obtain the desired dehydration of the aqueous hydrazine charged to the still, i. e., to obtain a substantially anhydrous hydrazine-aniline mixture from the still which can be worked up in the hydrazine still to produce a product containing at least 95% hydrazine. The number of theoretical plates required may be such that practical considerations dictate the use of more than one azeotrope still to obtain the necessary dehydration of the original aqueous hydrazine charged to the process.

I have found that in the operation of the azeotrope still careful control of the aniline-hydrazine mole ratio in the range of about 3:1 to about 12:1 in a feed material having a hydrazine-water mole ratio in the range of about 0.5:1 to about 2:1 combined with careful control of the reflux ratio within the range of 1.1:1 to 15:1, and preferably within the range of about 3:1 to 5:1, has enabled me to achieve optimum operation of the azeotrope still with a drastic reduction in the minimum number of theoretical plates usually required to accomplish the necessary dehydration of the aqueous hydrazine. By operating the azeotrope still at a reflux ratio and with a feed material having an aniline-hydrazine mole ratio in the ranges defined above, I have been able to recover from an azeotrope still having only about 7 to about 15 theoretical plates, and under preferred conditions only about 7 to about 10 theoretical plates, a substantially anhydrous hydrazine-aniline mixture which can be utilized in the hydrazine still to produce a hydrazine product having at least 95% hydrazine. This drastic reduction in the minimum number of theoretical plates required in the azeotrope still constitutes a substantial economic improvement in the entire azeotrope distillation process, for capital costs of the equipment are thereby materially reduced.

In the operation of the azeotrope still in the azeotropic distillation process of my invention, a feed material having a hydrazine-water mole ratio in the range of about 0.5:1 to about 2:1, i. e., aqueous hydrazine containing about 50 to about 70% hydrazine, and an aniline-hydrazine mole ratio in the range of about 3:1 to about 12:1 and preferably about 7:1, is charged to the azeotrope still at a point somewhat above the middle. The azeotrope still is designed to have only about 7 to about 15 theoretical plates, and for preferred operations need have only about 7 to about 10 theoretical plates. The reflux ratio, i. e., the quantity of reflux to the azeotrope still per unit quantity of aniline-water azeotrope distillate removed from the azeotrope still to further processing or discard, is preferably maintained in the range of 3:1 to 5:1 although the reflux ratio may vary over a wider range, i. e., 1.1:1 to 15:1. When the operating conditions in the still are at equilibrium the bottom temperature in the still is not below about 128° C. and the top temperature may vary from about 98.5 to 100° C. The overhead aniline-water azeotrope contains substantially less than 1% hydrazine, actually about 0.1% or less, and a substantially anhydrous hydrazine-aniline mixture accumulates in the still as a bottoms product.

The bottoms product of the azeotrope still, which comprises almost the entire amount of the hydrazine charged to that still and a major portion of the aniline charged to that still, is passed to the hydrazine still as feed material. The hydrazine still is operated at an overhead temperature of about 113° C. and at a bottom temperature in the range of about 135° C. to 184° C. to obtain substantially anhydrous hydrazine overhead, i. e., a hydrazine product containing at least 95% hydrazine as demanded by commerce, and aniline from the bottom. The aniline bottoms from the hydrazine still are recycled to the azeotrope still as a portion of the aniline introduced to that still with fresh aqueous hydrazine feed. As described in my pending application, Serial No. 361,186, filed June 12, 1953, a portion of this recycle aniline passing to the azeotrope still is diverted with advantage to an aniline recovery still to which the remainder of the aniline-water azeotrope distillate taken overhead from the azeotrope still after reflux to the azeotrope still is also charged. In this aniline still, the aniline is purified before return to the azeotrope still so as to maintain the concentration of non-volatile impurities in the total aniline recycle stream below objectionable limits.

The azeotrope still can be designed with as few as about seven to fifteen theoretical plates by using a feed material made up of aniline and an aqueous hydrazine solution approximating hydrazine hydrate or the hydrazine-water azeotrope, i. e., a hydrazine-water mole ratio in the range of about 0.5:1 to about 2:1 or about 50 to 70% by weight of hydrazine, in which the aniline-hydrazine mole ratio is maintained in the range of about 3:1 to about 12:1 and the reflux ratio is maintained in the range of about 1.1:1 to about 15:1. It is a peculiarity of the aniline-hydrazine-water system that the theoretical plate requirement for the desired dehydration rises rapidly and is almost infinite when the reflux ratio is below about 1.1:1 or above about 15:1. Higher reflux ratios thus do not significantly reduce the plate requirement but they do add to the heat input requirement of the still. It is advantageous to reduce this heat input requirement by providing an adequate number of plates in the column. However, capital cost increases rapidly with increasing number of plates and not more than about 10 plates are thus preferred. More than about 15 plates are ineffective in reducing the required reflux ratio for the desired separation to below about 1.1:1.

When the hydrazine-water mole ratio in the feed to the azeotrope still is about 1:1 and the aniline-hydrazine mole ratio in the feed is carefully controlled as shown in column 1 of the following table, the reflux ratios shown in column 2 require the minimum number of plates shown in column 3:

| (1) Aniline-Hydrazine Mole Ratio | (2) Reflux Ratio | (3) Required Plates, Minimum |
|---|---|---|
| 7.0:1 | 7:1 | 6.5 |
| 7.0:1 | 5:1 | 7.0 |
| 6.0:1 | 3:1 | 7.9 |

Since no great reduction of the plate requirement is effected by the use of high reflux ratios, the latter are preferably between about 3:1 and 5:1.

At a given hydrazine-water mole ratio in the feed to the azeotrope still of about 1:1 and a given reflux ratio, e. g., 5:1, the aniline-hydrazine mole ratio in the feed to the azeotrope still also affects the number of plates required to achieve the desired dehydration of the aqueous hydrazine as shown in the following table:

| Aniline-Hydrazine, Mole Ratio | Required Plates, Minimum |
|---|---|
| 7.0:1 | 7.0 |
| 3.0:1 | 10.0 |
| 2.0:1 | 15.0 |

Since the number of plates should not exceed 15 for theoretical and practical reasons as discussed above, the aniline-hydrazine mole ratio in the feed should not be less than about 2:1. However, as can be seen in the table immediately above, an increase in the aniline-hydrazine mole ratio from 2:1 to 3:1 for the conditions given results in a decrease of the minimum number of theoretical plates required from 15 to 10, a decrease of 33%, whereas a further increase in the aniline-hydrazine mole ratio affects the minimum number of theoretical plates required to a much lesser extent. Therefore, from an economic standpoint the minimum aniline-hydrazine mole ratio in the feed should not be less than about 3:1 to keep capital cost of the azeotrope still at a minimum. The aniline-hydrazine mole ratio should not be above about 12:1 since the concentration of hydrazine in the hydrazine-aniline mixture produced as bottoms in the azeotrope still and to be separated in the hydrazine still becomes so dilute as to require an excessive number of plates in that still, and an unreasonable aniline recycle burden is also imposed on the system. For these reasons, the aniline-hydrazine mole ratio in the feed should be maintained within the range of about 3:1 to about 12:1, when the hydrazine-water mole ratio in the feed is in the range of about 0.5:1 to 2:1, and the reflux ratio is in the range of about 3:1 to 5:1, so that an azeotrope still of about 7 to 10 theoretical plates may be employed and subsequent processing may be conducted efficiently. In the preferred range of aniline-hydrazine mole ratios in the feed, the recycling load of aniline is diminished and the concentration of hydrazine in the bottoms product of the azeotrope still is increased thus decreasing the requisite number of plates in the hydrazine still.

Temperatures at the top of the azeotrope still may vary from about 98.5 to 100° C. at atmospheric pressure and still equilibrium, and the bottom temperature will be not below about 128° C.

Under the preferred conditions of operation, as described above, the bottoms from the azeotrope still comprise about 5 to 20% by weight of hydrazine, about 0.1 to 0.7% of water and the rest aniline. Such a bottoms product can be separated in the hydrazine still to obtain an overhead product containing at least 95% hydrazine, not over about 4% of water and not over about 0.5% of aniline. The hydrazine still may suitably have a theoretical plate equivalent of about 5 to 9 plates and be operated using a reflux ratio of the order of about 4:1. In the hydrazine still, temperatures are about 113° C. at the top and about 135° C. to 184° C. at the bottom.

The recycle stream of aniline from the bottom of the hydrazine tower may contain up to about 10% of hydrazine, but usually does not exceed about 1%. However, this amount of hydrazine is taken into account in controlling the aniline-hydrazine mole ratio in the feed to the azeotrope still defined above.

The azeotropic distillation process of my invention will be illustrated by the following example:

A feed stream consisting of 7.1% hydrazine, 6.4% water and 86.5% aniline, having a mole ratio of hydrazine to water of 0.624 and of aniline to hydrazine of 4.19 was distilled continuously at a 3:1 reflux ratio in an azeotrope still consisting of 10-12 theoretical plates. The bottom temperature of the azeotrope still was maintained at 146° C. The overhead aniline-water azeotrope contained less than 0.1% hydrazine by weight, remainder 18% aniline and about 81.9% water.

The bottoms product from this azeotropic distillation, which contained less than about 0.4% water by weight and the remainder about 7.7% hydrazine and about 91.9% aniline, was continuously distilled at a 4:1 reflux ratio in a hydrazine still with 7–9 theoretical plates to yield a bottoms product of essentially pure aniline and an overhead product of 95.4% hydrazine containing less than 0.1% aniline.

The azeotropic distillation process of my invention will be further illustrated by the description of the accompanying drawing which is a flow diagram of a complete embodiment of an azeotropic distillation process.

In the drawing, dilute aqueous hydrazine, such as may be produced by distillation of the Raschig synthesis liquor, is passed to a hydrate still 10 through line 11. Water vapor is taken overhead from the hydrate still 10 through line 12 to a condenser 13. Some of the water distillate is returned from condenser 13 through lines 14 and 15 to the hydrate still 10 as reflux and the remainder is passed through line 16 to discard or to further processing to recover any minor amount of hydrazine which may be present. A hydrazine-water mixture accumulates in the hydrazine still 10 as bottoms and is passed through line 17 to reboiler 18 which is suitably heated by steam coils or the like. A portion of the hydrazine-water mixture in the reboiler 18 is returned to the hydrate still 10 as vapor through line 19 to supply heat for the distillation taking place in the hydrate still 10.

The remainder of the hydrazine-water mixture in the reboiler 18 is discharged through line 20 and with aniline make-up passes through line 21 to azeotrope still 22 which is designed to have only about 7 to 15 theoretical plates. Additional aniline in the form of aniline recycled from other parts of the azeotropic distillation system is passed to line 21 through lines 23 and 24 and provides the balance of the feed material to azeotrope still 22. The hydrate still 10 is operated to produce a bottoms product having a hydrazine-water mole ratio in the range of 0.5:1 to 2:1. Aniline make-up is metered to the azeotrope still 22 through line 21 in such proportions that the aniline-hydrazine mole ratio in the total feed passing to azeotrope still 22, i. e., including the recycle aniline returned to the azeotrope still 22 through lines 23 and 24, is in the range of about 3:1 to 12:1.

From azeotrope still 22, an aniline-water azeotrope is taken overhead through line 25 to a condenser-seperator 26 in which this azeotrope is first condensed and then separated into a water phase and an aniline phase, suitably by providing in the condenser-separator 26 a separator of the baffled type in which the separator space is divided by baffles to force immiscible liquids of different densities to pass to different zones. A portion of this condensed azeotrope is returned to the azeotrope still 22 as reflux through line 27. This reflux for the azeotrope still 22 is composed of the aniline phase plus the necessary portion of the water phase to maintain the reflux ratio in the preferred range of about 3:1 to 5:1 although the reflux ratio may vary in the broader range of 1.1:1 to 15:1. The balance of the condensed azeotrope from condenser-separator 26 is passed through line 28 to an aniline recovery still 29 in which any contained aniline is recovered for return to the process.

A substantially anhydrous hydrazine-aniline mixture accumulates in azeotrope still 22 as bottoms and is passed through line 30 to reboiler 31 suitably heated by steam coils or the like. A portion of these bottoms are returned to azeotrope still 22 from reboiler 31 as vapors through line 32 to provide the necessary heat for distillation. The remainder of the bottoms of azeotrope still 22 pass out of reboiler 31 through line 33 and are charged to hydrazine still 34 as feed material.

In hydrazine still 34, substantially anhydrous hydrazine is distilled from the hydrazine-aniline mixture charged as feed material and this anhydrous hydrazine passes overhead through line 35 to condenser 36 from which a portion is returned to hydrazine still 34 as reflux through lines 37 and 38 and the remainder is withdrawn as the anhydrous hydrazine product through line 39. Any contaminating aniline in this anhydrous hydrazine product may be removed by solvent extraction as described in my pending application, Serial No. 361,184, filed June 12, 1953.

The bottoms of the hydrazine still 34 comprising aniline, which may contain from 1% to 10% hydrazine depending on the operation of the hydrazine still 34, are withdrawn from hydrazine still 34 through line 40 to reboiler 41 which is suitably heated by steam coils or the like. From reboiler 41, a portion of these bottoms are returned to the hydrazine still 34 as vapors through line 42 to provide the necessary heat for the hydrazine distillation. The remainder of the aniline bottoms in reboiler 41 are discharged through line 24 and recycled to azeotrope still 22. However, as described in my pending application, Serial No. 361,186, a minor portion of these bottoms is diverted with advantage through line 43 to aniline recovery still 29 in which the aniline is purified before return to the azeotrope still 22 so as to maintain the concentration of non-volatile impurities in the total aniline recycle stream below objectionable limits. The integration of the aniline recovery still 29 in an azeotropic distillation system not only reduces the quantity of non-volatile impurities in the total aniline recycle stream to tolerable limits but also conserves aniline and prevents any possible loss of hydrazine which might otherwise be passed to discard with the water phase from condenser-separator 26.

The charge material to the aniline recovery still 29 is made up of the minor portion of the recycle aniline diverted from line 24 to the aniline recovery still 29 through line 43 and the remainder of the aniline-water azeotrope distillate taken overhead from the azeotrope still 22 after reflux to the azeotrope still 22. This distillate from the condenser-separator 26 passes to the aniline recovery still 29 through line 28.

In the aniline recovery still 29, all of the aniline and a portion of the water contained in the feed to this still are taken overhead as an aniline-water azeotrope through line 44 to a condenser 45 from which the distillate passes to separator 46 through line 47. The separator 46 is suitably of the baffled type in which the separator space is divided by baffles to force immiscible liquids of different densities to pass to different zones. In the separator 46 the condensed aniline-water azeotrope taken overhead from the aniline recovery still 29 is separated into an aniline phase and a water phase. The water phase is returned to aniline recovery still 29 as reflux through line 48 and the aniline phase is withdrawn from the separator 46 through line 23 and passes back to the azeotrope still 22 as a portion of the aniline charged to that still with fresh aqueous hydrazine feed.

Almost completely aniline-free bottoms accumulate in the aniline recovery still 29 and are passed to reboiler 49 through line 50. The reboiler 49 is suitably heated by steam coils or the like in order to vaporize a portion of the material accumulating in the reboiler 49, and these vapors are returned to aniline recovery still 29 through line 51 to provide the necessary heat for the distillation. The remainder of the still bottoms in the reboiler 49 comprising water, any hydrazine and any non-volatile impurities which may be present in the feed charged to the aniline recovery still through lines 43 and 28, are passed either to discard, or, if loss of the contained hydrazine is to be prevented, these bottoms are passed to an evaporator (not shown) for the removal of the non-volatile impurities and the return of water and hydrazine to the hydrate still 10.

I claim:

1. In the production of anhydrous hydrazine by the azeotropic distillation of aqueous hydrazine solutions employing aniline as an entraining agent for water in which aniline and an aqueous solution of hydrazine are charged to an azeotrope still as feed material, an aniline-water azeotrope is removed overhead from this azeotrope still and the major portion of the aniline content and a portion of the water content of the azeotrope are returned to the azeotrope still as reflux, an aniline-hydrazine mixture is removed from the azeotrope still and charged to a hydrazine still, and substantially anhydrous hydrazine is removed overhead from this hydrazine still leaving aniline bottoms which are recycled to the azeotrope still; the improvement which comprises charging aniline and an aqueous solution of hydrazine to the azeotrope still as a feed material having a hydrazine-water mole ratio in the range of about 0.5:1 to about 2:1 and an aniline-hydrazine mole ratio in the range of about 3:1 to about 12:1, operating the azeotrope still at a reflux ratio in the range of 1.1:1 to 15:1, and recovering a substantially anhydrous hydrazine-aniline mixture from the azeotrope still as a bottoms product.

2. In the production of anhydrous hydrazine by the azeotropic distillation of aqueous hydrazine solutions employing aniline as an entraining agent for water in which aniline and an aqueous solution of hydrazine are charged to an azeotrope still as feed material, an aniline-water azeotrope is removed overhead from this azeotrope still and the major portion of the aniline content and a portion of the water content of the azeotrope are returned to the azeotrope still as reflux, an aniline-hydrazine mixture is removed from the azeotrope still and charged to a hydrazine still, and substantially anhydrous hydrazine is removed overhead from this hydrazine still leaving aniline bottoms which are recycled to the azeotrope still; the improvement which comprises charging aniline and an aqueous solution of hydrazine to the azeotrope still as a feed material having a hydrazine-water mole ratio in the range of about 0.5:1 to about 2:1 and an aniline-hydrazine mole ratio in the range of about 3:1 to about 12:1, operating the azeotrope still at a reflux ratio in the range of 3:1 to 5:1, and recovering a substantially anhydrous hydrazine-aniline mixture from the azeotrope still as a bottoms product.

References Cited in the file of this patent

UNITED STATES PATENTS 2,537,791     Schwarcz _____ Jan. 9, 1951

FOREIGN PATENTS 620,713     Great Britain _____ Mar. 29, 1949
652,855     Great Britain _____ May 2, 1951

OTHER REFERENCES

The Chemistry of Hydrazine, by Audrieth and Ogg, 1951 (pages 42–53 relied on).